(12) United States Patent
Sivertsen

(10) Patent No.: US 8,164,433 B2
(45) Date of Patent: Apr. 24, 2012

(54) DETECTING FAULTS IN A WIRING HARNESS

(75) Inventor: David William Sivertsen, La Canada, CA (US)

(73) Assignee: AC Propulsion, Inc., San Dimas, CA (US)

( * ) Notice: Subject to any disclaimer, the term of this patent is extended or adjusted under 35 U.S.C. 154(b) by 377 days.

(21) Appl. No.: 12/426,183

(22) Filed: Apr. 17, 2009

(65) Prior Publication Data

US 2010/0265051 A1    Oct. 21, 2010

(51) Int. Cl.
*B60Q 1/00* (2006.01)

(52) U.S. Cl. ........... 340/438; 340/636.1; 340/636.12; 340/636.13; 340/636.15; 324/539

(58) Field of Classification Search ............ 340/438, 340/439, 635, 636.1, 636.12, 636.13, 636.15, 340/636.16, 636.19, 657, 660, 661, 664; 324/539, 36, 66, 503; 702/58; 320/134, 320/156
See application file for complete search history.

(56) References Cited

U.S. PATENT DOCUMENTS

| | | | |
|---|---|---|---|
| 4,246,566 A | 1/1981 | Endo et al. | |
| 4,764,727 A | 8/1988 | McConchie, Sr. | |
| 4,931,738 A | 6/1990 | MacIntyre et al. | |
| 4,956,561 A | 9/1990 | Tamer | |
| 4,959,792 A | 9/1990 | Sullivan | |
| 5,264,796 A | 11/1993 | Klassen et al. | |
| 5,268,644 A | 12/1993 | Klassen et al. | |
| 5,491,631 A | 2/1996 | Shirane et al. | |
| 5,592,093 A | 1/1997 | Klingbiel | |
| 5,691,611 A | 11/1997 | Kojima et al. | |
| 5,818,673 A | 10/1998 | Matsumaru et al. | |
| 5,848,365 A * | 12/1998 | Coverdill | 701/35 |
| 5,854,555 A | 12/1998 | Sasaki | |
| 5,903,156 A | 5/1999 | Matsumaru et al. | |
| 6,011,399 A | 1/2000 | Matsumaru et al. | |
| 6,211,681 B1 | 4/2001 | Kagawa et al. | |
| 6,243,018 B1 | 6/2001 | Saito et al. | |
| 6,759,851 B2 | 7/2004 | Hazelton | |
| 6,833,713 B2 | 12/2004 | Schoepf et al. | |
| 6,931,332 B2 | 8/2005 | Phansalkar et al. | |
| 6,960,918 B2 | 11/2005 | Hazelton | |
| 2003/0206111 A1 | 11/2003 | Gao et al. | |
| 2006/0108956 A1 | 5/2006 | Clark et al. | |
| 2007/0143064 A1 | 6/2007 | Boran et al. | |
| 2007/0153780 A1 | 7/2007 | Stanley | |

FOREIGN PATENT DOCUMENTS

| | | |
|---|---|---|
| JP | 61-232936 | 10/1986 |
| JP | 2001-157367 | 6/2001 |
| JP | 2003-102101 | 4/2003 |
| WO | 2008049436 | 5/2008 |
| WO | 2008077439 | 7/2008 |

OTHER PUBLICATIONS

International Search Report and Written Opinion for International Application No. PCT/US2010/031312, mailed Oct. 13, 2010.

\* cited by examiner

*Primary Examiner* — Anh V La
(74) *Attorney, Agent, or Firm* — Nixon Peabody LLP

(57) ABSTRACT

Cell voltages within a battery pack and a voltage delivered to a load or drive system, along with a current delivered to the system, are monitored and used to detect a possible abnormal condition of a wiring harness.

24 Claims, 2 Drawing Sheets

DETECTING FAULTS IN A WIRING HARNESS

TECHNICAL FIELD

The present disclosure relates generally to the monitoring of electrical interconnections in large electrically powered devices.

BACKGROUND

Electrical devices such as electric vehicles and electrically powered equipment of various types are becoming more important in many applications. Such devices relevant to the present disclosure typically incorporate a relatively large battery pack and a load such as a drive system. An example of such an electrical device is an electric car. An electric car typically includes a relatively large battery or battery pack typically formed of a large plurality of individual battery cells. The battery may be charged by equipment in the car or by off-board equipment and discharges normally by providing power to the drive system and other systems associated with the car. High power levels in excess of 40 KW (and up to and exceeding 150 KW) are often used in such applications, accordingly, safety and reliability are important issues.

Typically the battery and drive systems of electric vehicles are coupled with a functional high-voltage wiring harness capable of transferring tens or hundreds of kilowatts of electrical power between the battery pack and the drive system. Modern electric vehicles incorporate regenerative braking systems and so this power may travel in either direction (to or from the battery) at any given moment.

The high-voltage wiring harness is typically comprised of one or more of the following components: wire or cable; connectors or couplings (having mechanical, soldered or crimped joints); cell-to-cell connections; fuses and their holders; and contactors. Any fault in any of these components can cause a relatively large resistance in an otherwise low resistance path which, due to the large currents and voltage present, can result in large and undesirable amounts of heat being generated within a small area of the electrical vehicle. Early detection and response to such a fault would be highly desirable.

OVERVIEW

A monitor circuit for an electrical device such as an electric vehicle or piece of electric equipment (1) compares (a) the summed voltages of the cells of a battery pack providing power to the device with (b) the voltage applied to the load of the device and (2) measures the current in the circuit. The nominal resistance of the system (including battery pack, load and wiring harness) is specified or determined initially and periodically compared to recently measured values in order to detect a wiring harness fault.

Additional features and benefits of the present invention will become apparent from the detailed description, figures and claims set forth below.

BRIEF DESCRIPTION OF THE DRAWINGS

The accompanying drawings, which are incorporated into and constitute part of this specification, illustrate one or more examples of embodiments and, together with the description of example embodiments, serve to explain the principles and implementations of the embodiments.

In the drawings.

DESCRIPTION OF EXAMPLE EMBODIMENTS

Example embodiments are described herein in the context of an electrically powered vehicle incorporating fault detection in its wiring harness. Those of ordinary skill in the art will realize that the following description is illustrative only and is not intended to be in any way limiting. Other embodiments will readily suggest themselves to such skilled persons having the benefit of this disclosure. Reference will not be made in detail to implementations of the example embodiments as illustrated in the accompanying drawings. The same reference indicators will be used to the extent possible throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with this disclosure, the components, process steps, and/or data structures described herein may be implemented using various means including computer-implemented means and hard-wired means. The computer-implemented means may incorporate various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card, paper tape and the like) and other types of program memory.

Figure 1:
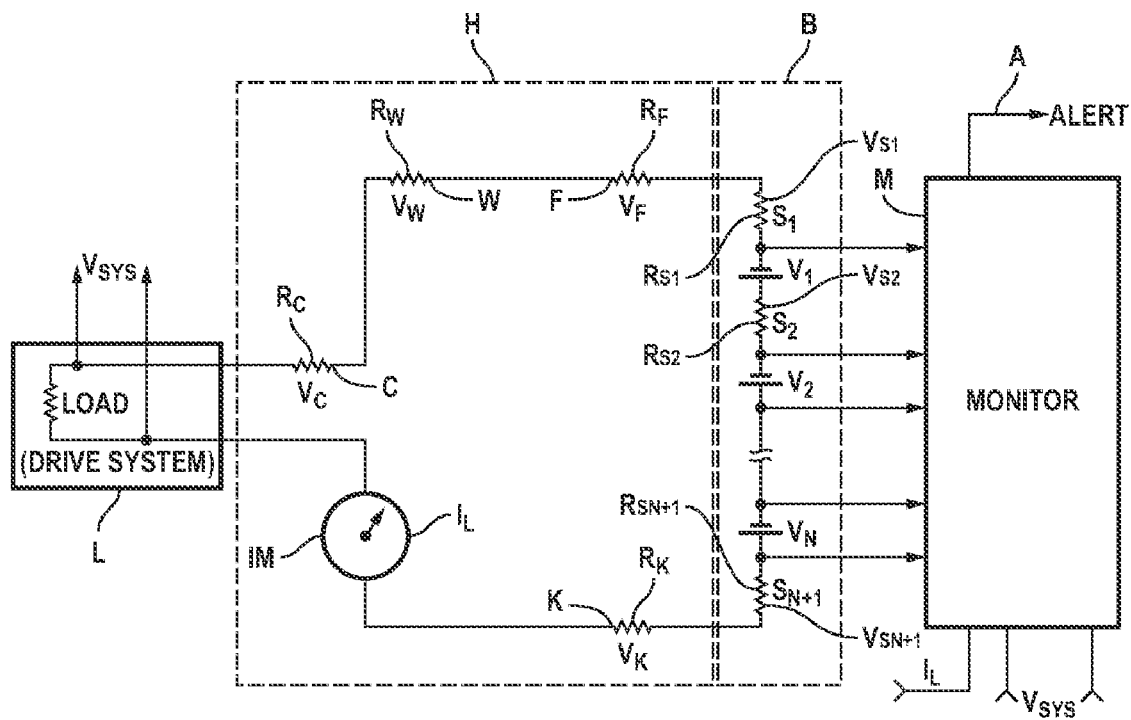
FIG. 1 is an electrical schematic diagram of a fault detection system in accordance with one embodiment.

FIG. 1 is an electrical schematic diagram of a fault detection system in accordance with the one embodiment of the present invention. Turning to FIG. 1, the fault detection system shown detects hazardous faults in a battery wiring harness such as the high voltage wiring harness for an electric vehicle drive system. The same or similar detection methods may be applied to electrical systems of various types, including for example systems for powering other types of electric vehicles and equipment.

In accordance with the system of FIG. 1, a battery B, which may be constructed by coupling together a large plurality of battery cells in series (each battery cell may include one or more parallel-connected sub-cells), is connected to a load L through a wiring harness H. In the illustrated example, the wiring harness H includes a contactor K, a connector C, a wire W, a fuse F, and a plurality N+1 of series-oriented cell interconnects $S_1$-$S_{N+1}$ (collectively S) between and leading to N adjacent series-connected cells, each of which has an electrical resistance associated therewith (i.e., $R_K$, $R_C$, $R_W$, $R_F$, and $R_S$, each causing corresponding voltage drops $V_K$, $V_C$, $V_W$, $V_F$, and $V_S$, where $VS=V_{S1}+V_{S2}+\ldots+V_{SN+1}$ and $R_S=R_{S1}+R_{S2}+\ldots+R_{SN+1}$). In the case of an electric vehicle, the load may be a drive system of the electric vehicle, for example.

A monitor circuit M is provided. It monitors voltages $V_1$, $V_2, \ldots, V_N$ across the battery cells and a load voltage $V_{SYS}$. It also monitors a load current $I_L$ measured by a current measuring circuit IM. The current measuring circuit IM is illustrated schematically only and make take any of various forms, including a shunt, an inductive current sensor, or a Hall Effect current sensor, for example. The monitor circuit M may include, for example, analog-to-digital conversion circuitry for converting voltages to digital values, together with a digital processor, memory, I/O circuitry, and the like.

In the illustrated embodiment, the monitor circuit M generates an alert signal on line A when an abnormal condition is detected. The alert signal may be generated in any of a number of ways. In the case of an electric vehicle, the alert signal may be communicated to a vehicle controller unit to cause a code to be stored therein for diagnostic use at a later time. The vehicle controller unit may also cause a dashboard indicator within the passenger cabin of the electric vehicle to display or annunciate the alert so as to warn a driver of a potential problem. In addition to or in lieu of logging an error code or producing a visual and/or audible warning, the system may cause a restriction in vehicle operations, such as reduced power, reduced regeneration (in a vehicle using regenerative braking or the like), or recharging restrictions. Such restrictions are desirable for safety reasons and serve as a visible indication that corrective service is essential.

Referring still to FIG. 1, the system voltage $V_{SYS}$ may be described by the following equation:

$$V_{SYS}=V_{LOSSES}(I)+V_{CELLS} \quad \text{(EQ. 1)}$$

where:
$V_{LOSSES}(I)=[V_K(I)+V_C(I)+V_W(I)+V_F(I)+V_S(I)]$, and
$V_{CELLS}=\Sigma(V_1 \ldots V_N)$, i.e., the sum (output) of the voltages of the N cells of the battery pack.

$V_{SYS}$ and $V_{CELLS}$ are measured direct current (DC) voltage values. $V_{LOSSES}(I)$ is the sum of the current induced voltage drops across all of the other elements in the harness, including contactors (K), connectors (C), wire (W), fuses (F), cell interconnects (S), and the like. That is, the system voltage $V_{SYS}$ is the combination of the battery voltage $V_{CELLS}$ and the current-induced voltage drops across all of the other components of the wiring harness, i.e., $V_{LOSSES}(I)$. The (I) refers to a particular current level because each of the loss components varies as a function of load current $I_L$. Note that other potential losses may also be incorporated in $V_{LOSSES}(I)$ by simply identifying them, measuring them and including them in the $V_{LOSSES}(I)$ calculation.

From Ohm's Law (V=IR), at zero electrical current (I=0 amperes), the current induced voltage drop will be zero for the resistive component of the harness, and:

$$V_{SYS}=V_{CELLS} \quad \text{(EQ. 2)}$$

At non-zero electrical currents:

$$V_{LOSSES}(I)=V_{SYS}-V_{CELLS} \quad \text{(EQ. 3)}$$

and:

$$R_{HARNESS}=V_{LOSSES}(I)/I_L \quad \text{(EQ. 4)}$$

The resistance of the harness ($R_{HARNESS}$) is a design parameter, and any significant increase over a predetermined design value or initially measured level represents a detected fault. Continuous or periodic monitoring of the cell voltages $V_{CELLS}$, the system voltage $V_{SYS}$, and the load current $I_L$ allows determination of a fault at non-zero currents.

Figure 2:
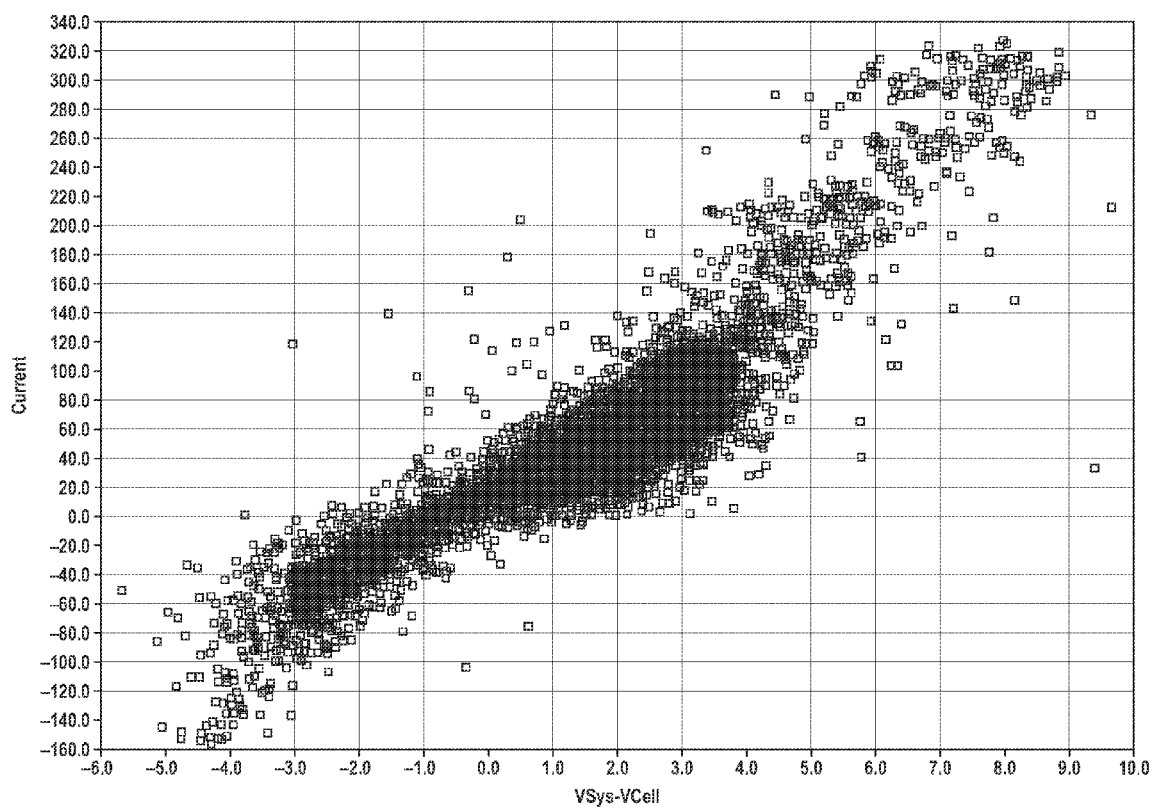
FIG. 2 is a voltage-current scatter-plot diagram illustrating a form of fault detection in accordance with one embodiment.

FIG. 2 is a voltage-current scatter-plot diagram illustrating another form of fault detection useable with electric vehicles in accordance with one embodiment of the present invention. In accordance with the approach illustrated in FIG. 2, measurements of $V_{LOSSES}(I)$ and of load current $I_L$ are aggregated over time in order to extract the slope from a linear fit to this data. The slope of these current and voltage points represents the resistance of the harness, and is resistant to constant offset voltage errors from any calibration difference between cell and system voltage measurements. Any offset voltage error term can be cancelled with a zero current measurement of the same. Another benefit of this approach is that it allows for the detection of "fritting". Fritting describes a nonlinear breakdown phenomenon in which a loose connection manifests itself in terms of anomalous conduction near zero current, resulting in a large scatter of points in the IV plot. FIG. 2 shows a scatter-plot diagram of wiring harness loss voltage (horizontal axis) versus current (vertical axis) for a system with a loose mechanical connection. The increased horizontal scatter near zero current is indicative of fritting and a problematic connection.

If a loose connection in a battery pack adds 25 milliohms or resistance, at 400 amps current, this added resistance results in 10V of drop (reduced performance) and 4 KW of point heating, which can cause major safety issues. Detection of a loose connection, using the phenomenon of fritting, for example, can therefore be of great importance.

Figure 3:
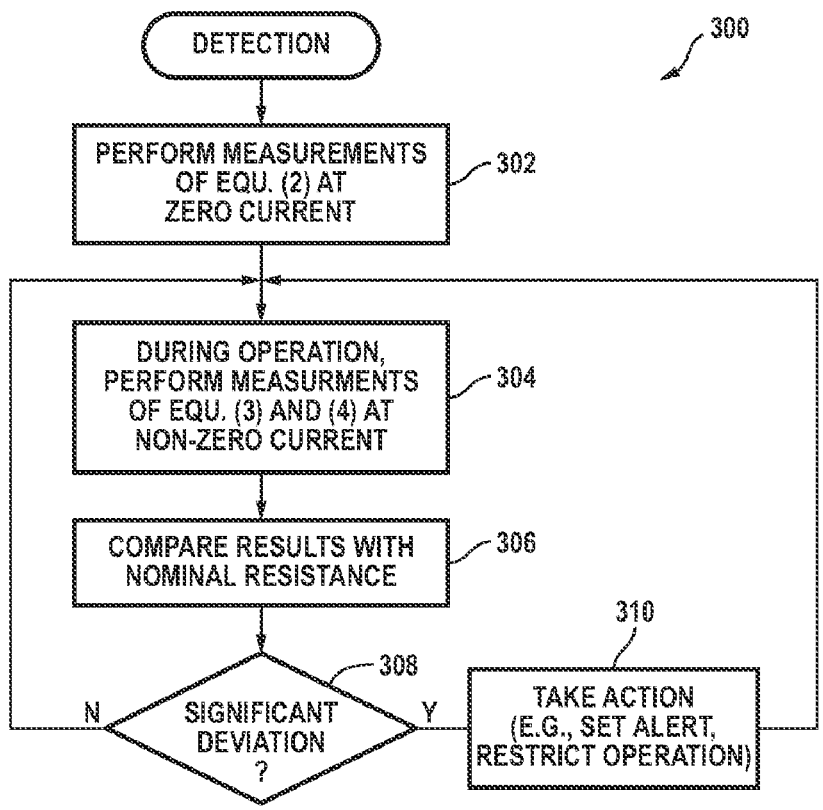
FIG. 3 is a process flow diagram illustrating a method of wiring harness fault detection in accordance with one embodiment.

FIG. 3 is a process flow diagram illustrating a method 300 for wiring harness fault detection in accordance with one embodiment.

Turning now to FIG. 3, at step 302 measurements of $V_{SYS}$ and $V_{CELLS}$ are made at zero load current ($I_L$=0) in accordance with EQ. (2) above. Any differences at zero load current represent calibration offsets between the two measurement systems, which should be independent of load current and can easily be factored out, as with the use of a lookup table. At step 304 a loop process begins. In this step, measurements are made at non-zero load currents in accordance with EQ. 3 and EQ. 4 above and used to determine the measured resistance $R_{HARNESS}$.

At step 306 the results obtained in Step 304 are compared with a previously stored nominal resistance, determined based on such factors as component manufacturer, components present, and the like, or stored physical measurement value(s) taken, for example, at the factory.

At step 308 the measured value $R_{HARNESS}$ is compared with the stored nominal value of $R_{HARNESS}$.

At step 308, if a significant deviation between the measured and stored nominal $R_{HARNESS}$ values is detected, then action is taken at step 310 such as setting an alert condition, restricting operation, and the like. The alert condition may be a visually or aurally perceptible signal, for example, and/or data written to a memory for later analysis. After setting the alert condition, restricting operation, and the like, operation may return to step 304 (unless the alert is such as to require shut-off of the electrical device).

If no significant deviation is detected at step 308, then operation continues at step 304.

While embodiments and applications have been shown and described, it would be apparent to those skilled in the art having the benefit of this disclosure that many more modifications than mentioned are possible without departing form the inventive concepts disclosed herein. The invention, therefore, is not to be restricted except in the spirit of the appended claims.

What is claimed is:

1. A method for detecting a possible abnormal condition of a wiring harness of a battery, comprising:
    determining a nominal resistance value of the wiring harness;
    monitoring voltages of a plurality of cells of the battery using a circuit to determine a first voltage value;
    monitoring a second voltage at a point in the wiring harness;
    monitoring a load current through the battery;
    using monitored values of the first and second voltage and load current to determine an operating resistance value of the wiring harness; and
    comparing the operating resistance value of the wiring harness to the nominal resistance of the wiring harness and taking an action if the operating resistance value exceeds the nominal resistance value by more than a predetermined threshold.

2. The method of claim 1, wherein the action comprising setting an alert condition, further comprising:
    alerting a driver of a vehicle of the alert condition.

3. The method of claim 1, wherein the action comprising setting an alert condition, further comprising:
    alerting a diagnostic technician servicing a vehicle of the alert condition.

4. The method of claim 1, wherein the action comprises restricting operation of the vehicle.

5. The method of claim 4, wherein restricting operation of the vehicle comprises at least one of the following: reducing power supplied to the vehicle, reducing a current obtained from regeneration, and restricting charging of the battery pack.

6. A method for detecting a possible abnormal condition of a wiring harness of a battery or battery pack, comprising:
    monitoring a voltage of the battery or battery pack using a circuit;
    monitoring a system voltage at a wiring harness termination point;
    monitoring a current through the battery or battery pack;
    tracking data points over a period of time, each data point having said current as one coordinate and having a voltage difference between the voltage of the battery or battery pack and the system voltage as another coordinate; and
    detecting a possible abnormal condition of the wiring harness based on a distribution of the data points.

7. The method of claim 6, further comprising detecting an abnormal condition when data points in a region near zero current exhibit an abnormal spread.

8. The method of claim 7, wherein the abnormal condition is a loose connection.

9. The method of claim 6, further comprising alerting a driver of a vehicle of the abnormal condition.

10. The method of claim 6, further comprising alerting a diagnostic technician servicing a vehicle of the abnormal condition.

11. The method of claim 6, wherein the action comprises restricting operation of the vehicle.

12. The method of claim 11, wherein restricting operation of the vehicle comprises at least one of the following: reducing power supplied to the vehicle, reducing a current obtained from regeneration, and restricting charging of the battery pack.

13. A system for detecting a possible abnormal condition of a wiring harness of a battery or battery pack, comprising:
    circuitry for monitoring a voltage of the battery or battery pack;
    circuitry for monitoring a system voltage at a wiring harness termination point;
    circuitry for monitoring a current through the battery or battery pack; and
    circuitry for:
        using monitored values to determine a resistance value of the wiring harness; and
        comparing the resistance value to a normal resistance value to detect a possible abnormal condition of the wiring harness.

14. The system of claim 13, further comprising an alert signal for alerting a driver of a vehicle of the abnormal condition.

15. The system of claim 13, further comprising an alert signal coupled to a vehicle controller to enable a diagnostic technician servicing a vehicle to be alerted to the abnormal condition.

16. The system of claim 13, comprising circuitry for restricting operation of the vehicle.

17. The system of claim 16, wherein restricting operation of the vehicle comprises at least one of the following: reducing power supplied to the vehicle, reducing a current obtained from regeneration, and restricting charging of the battery pack.

18. A system for detecting a possible abnormal condition of a wiring harness of a battery or battery pack, comprising:
    circuitry for monitoring a voltage of the battery or battery pack;
    circuitry for monitoring a system voltage at a wiring harness termination point;
    circuitry for monitoring a current through the battery or battery pack; and
    tracking and detecting circuitry for:
        tracking data points over a period of time, each data point having said current as one coordinate and having a voltage difference between the voltage of the battery or battery pack and the system voltage as another coordinate; and
        detecting a possible abnormal condition of the wiring harness based on a distribution of the data points.

19. The system of claim 18, wherein said tracking and detecting circuitry detects an abnormal condition when data points in a region near zero current exhibit an abnormal spread.

20. The system of claim 19, wherein the abnormal condition is a loose connection.

21. The system of claim 18, further comprising an alert signal for alerting a driver of a vehicle of the abnormal condition.

22. The system of claim 18, further comprising an alert signal coupled to a vehicle controller to enable a diagnostic technician servicing a vehicle to be alerted to the abnormal condition.

23. The system of claim 18, comprising circuitry for restricting operation of the vehicle.

24. The system of claim 23, wherein restricting operation of the vehicle comprises at least one of the following: reducing power supplied to the vehicle, reducing a current obtained from regeneration, and restricting charging of the battery pack.

* * * * *